United States Patent [19]
Alessio

[11] Patent Number: 5,172,032
[45] Date of Patent: Dec. 15, 1992

[54] METHOD OF AND APPARATUS FOR THE ENERGIZATION OF ELECTROLUMINESCENT LAMPS

[76] Inventor: David S. Alessio, 10 Buckley La., Prospect, Conn. 06712

[21] Appl. No.: 851,568

[22] Filed: Mar. 16, 1992

[51] Int. Cl.$^5$ .......................................... H05B 37/00
[52] U.S. Cl. ............................... 315/169.3; 315/171; 315/246; 340/825.81
[58] Field of Search ...................... 315/164, 169.3, 171, 315/172, 174, 246, 283, 287, 293, 306; 340/781, 825.81

[56] References Cited

U.S. PATENT DOCUMENTS 4,527,096 7/1985 Kindlmann ...................... 315/169.3

Primary Examiner—Eugene R. LaRoche
Assistant Examiner—Michael B. Shingleton
Attorney, Agent, or Firm—Chilton, Alix & Van Kirk

[57] ABSTRACT

An electroluminescent lamp is energized by being charged to a first polarity voltage level in step-wise fashion over a first period of time and then being discharged and charged to a second polarity voltage level in a time period which is short when compared to the first time period. The charging and discharging of the lamp is controlled by a pair of interconnected pulse generators which provide command signals to respective solid state switches. An inductance is connected in series with one of the switches and the electroluminescent lamp load and a diode are connected in parallel with the inductance in such a manner that the step-wise charging of the lamp occurs each time the switch connected in series with the inductance is opened.

16 Claims, 3 Drawing Sheets

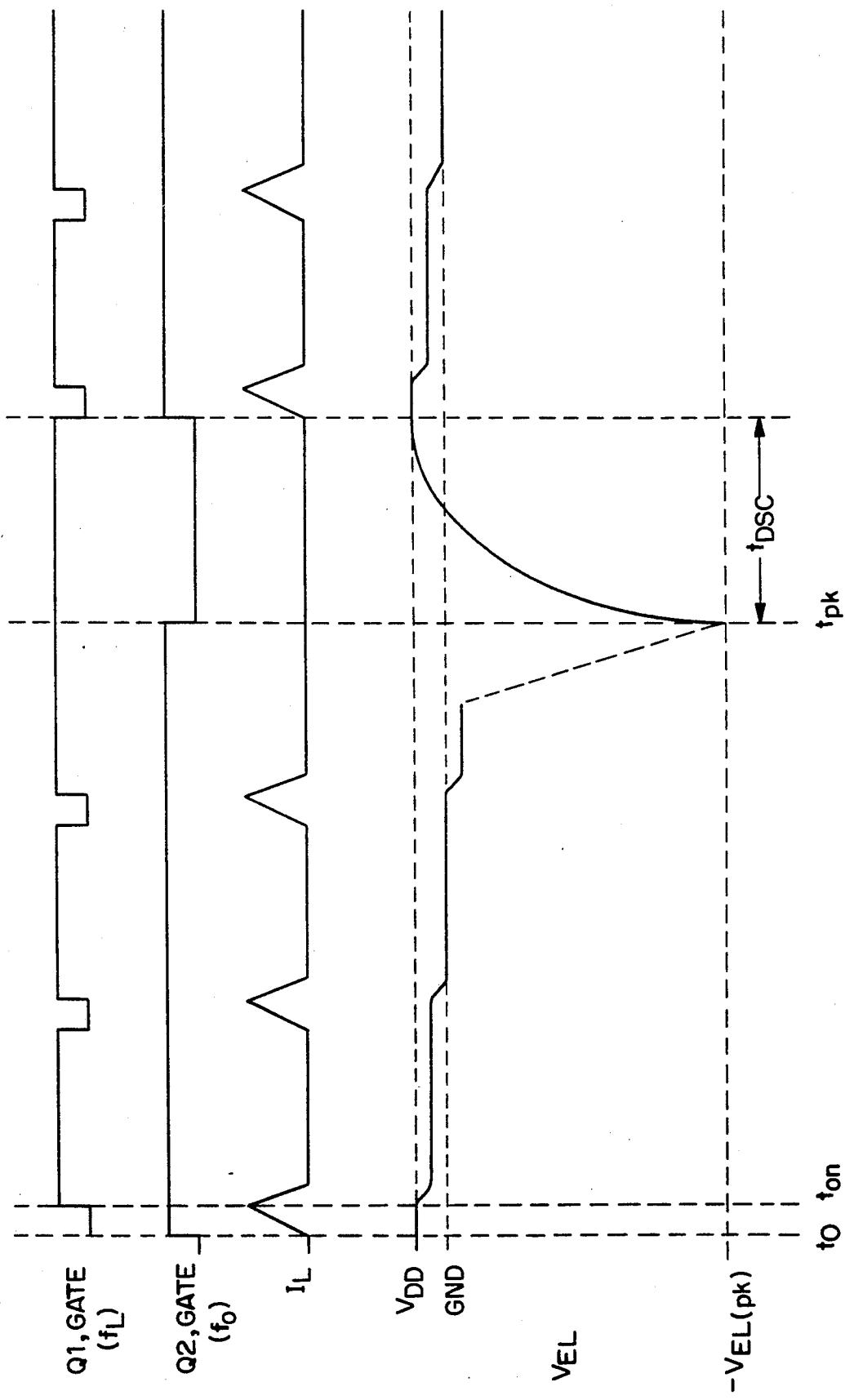

METHOD OF AND APPARATUS FOR THE ENERGIZATION OF ELECTROLUMINESCENT LAMPS

BACKGROUND OF THE INVENTION

1. Field of the Invention

The present invention relates to improvements in controlling the energization of electroluminescent lamps. More specifically, this invention is directed to an improved driver circuit for an electroluminescent (EL) display and particularly to an EL lamp driver which emulates a constant current source. Accordingly, the general objects of the present invention are to provide novel and improved methods and apparatus of such character.

2. Description of the Prior Art

Circuits for energizing, i.e., driving, EL lamps are well known in the art. For examples of such prior art lamp drivers, reference may be had to the present inventor's co-pending application Ser. No. 793,874 and U.S. Pat. No. 5,066,895. U.S. Pat. No. 5,066,895 also provides a discussion of the construction and utility of EL lamps.

An EL lamp is a light-emitting device which appears to the circuit supplying energy thereto as a capacitive load. As an EL lamp ages, its efficiency changes very little, provided the aging is intrinsic and not the result of moisture ingress. Thus, the power consumed by an EL lamp per lumen of light output is relatively constant. Accordingly, if an EL light could be operated from a constant current source, its brightness would remain relatively constant with time even though the electrical characteristics, particularly the capacitance, of the lamp would change to some degree.

Prior art EL lamp drivers, pursuant to an effort to maintain constant brightness over the service life of an EL lamp, and faced with the lamp operational characteristic of a decrease in capacitance with age, have had a tendency to be complex devices. Circuit complexity, which is typically manifested in the use of a significant number of components, is the antithesis of volumetric efficiency and also necessarily results in diminished reliability. With respect to volumetric efficiency, as circuit complexity increases, the ability to fabricate the lamp driver as an integrated circuit is significantly reduced. It is also to be noted that driver circuit cost increases with complexity and many prior art EL lamp drivers have employed comparative expensive transformers.

SUMMARY OF THE INVENTION

The present invention overcomes the above briefly discussed and other deficiencies and disadvantages of the prior art by providing a unique method and apparatus for energizing an electroluminescent lamp. In accordance with the present invention, pursuant to the emulation of a constant current source, "packets" of energy are delivered to the lamp.

Apparatus embodying a preferred form of the invention employs a pair of oscillators which provide asymmetric control signals for respective switches. The first switch is connected in series with an inductance across the supply voltage. The EL lamp load and a series connected diode are connected in parallel with the inductor. Each time the first switch is closed, current will flow from the supply voltage source through the inductor. When the first switch is opened, the inductor will force current to flow through the lamp by causing the diode to break down. Repeated closings of the first switch will, accordingly, charge the EL lamp load to a voltage level commensurate with the desired brightness, this voltage being opposite in polarity to the supply voltage. The second switch is connected between the supply voltage and the EL lamp and, when closed, will cause the lamp to discharge and charge to the level of the supply voltage. The frequency of operation of the second switch is much lower than that of the first switch. The maximum voltage to which the lamp is charged can be varied by changing the duty cycle of the oscillator which controls the first switch.

BRIEF DESCRIPTION OF THE DRAWINGS

The present invention may be better understood and its numerous objects and advantages will become apparent to those skilled in the art by reference to the accompanying drawings wherein like reference numerals refer to like elements in the several figures and in which.

DESCRIPTION OF THE DISCLOSED EMBODIMENT

Figure 1:
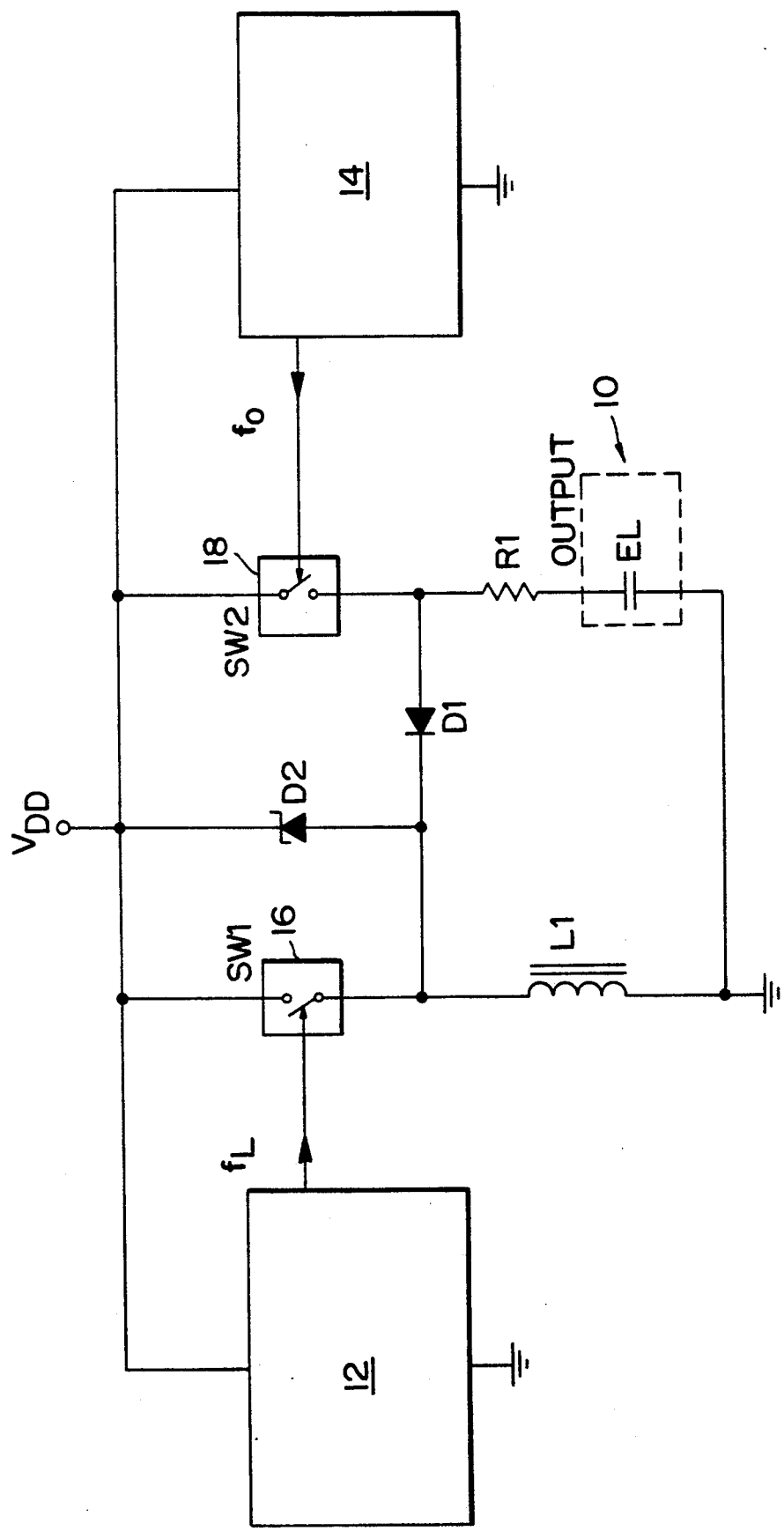
FIG. 1 is a circuit block diagram of a driver for an electroluminescent lamp in accordance with the present invention.
Figure 2:
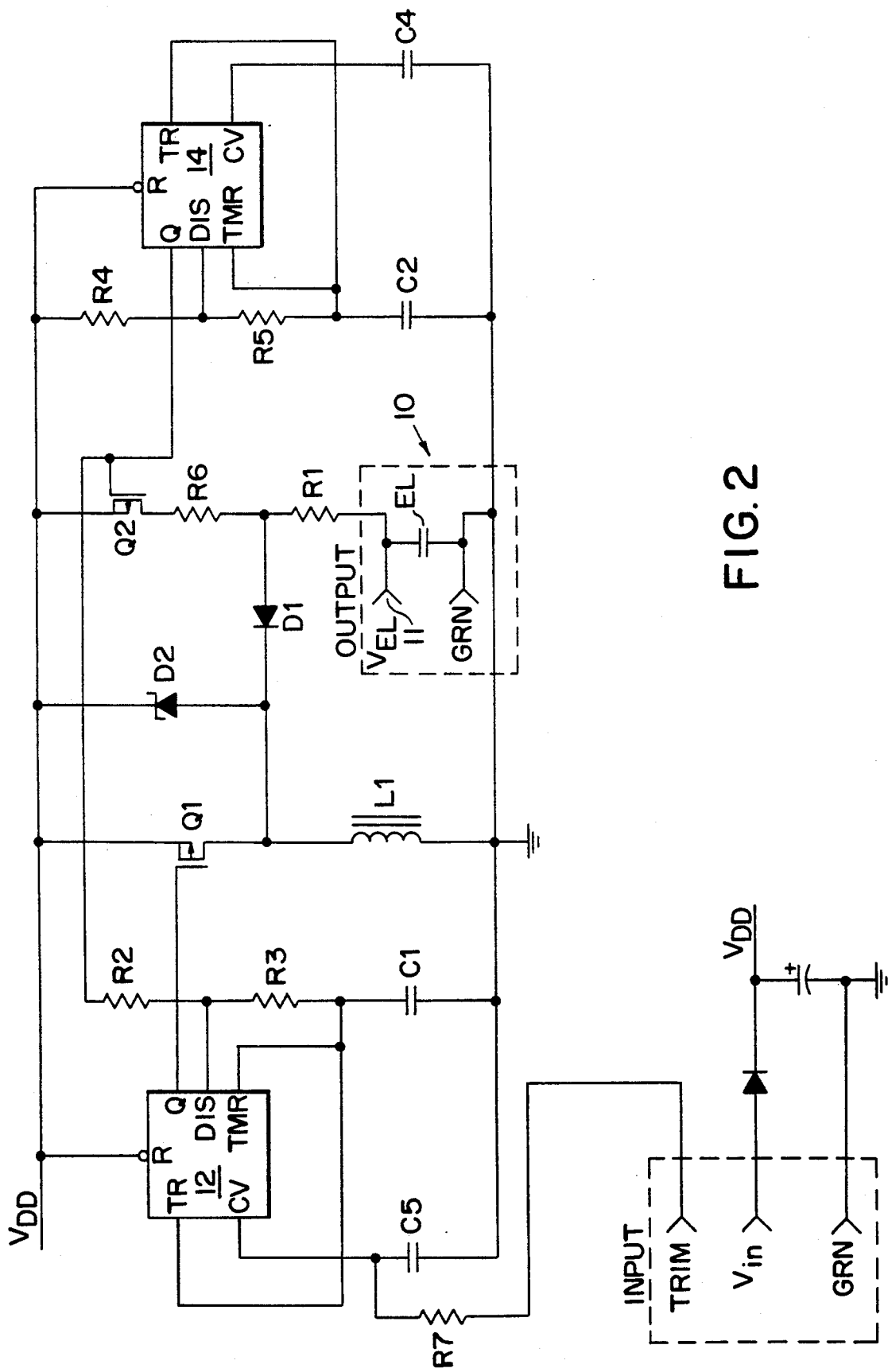
FIG. 2 is a schematic diagram of a preferred embodiment of the circuit of FIG. 1; an FIG. 3 is a waveform diagram which explains the operation of the circuit of FIGS. 1 and 2.

With reference to the drawings, an electroluminescent lamp load is indicated generally and schematically at 10 as a capacitance connected between the driver output terminal 11 and ground. The drive circuit for exercising control over the energization of lamp 10 includes a pair of pulse generators 12 and 14. In the disclosed embodiment of FIG. 2, the pulse generators 12 and 14 each are defined by a type 555 monolithic timing circuit In one reduction to practice, the pulse generators each comprised one-half of a type 556 integrated circuit. As is well known, a type 555 timer may function as a square wave pulse generator with the free running frequency and duty cycle being controlled with external passive circuit components. The square wave output pulses provided by timers 12 and 14, respectively at frequencies $f_L$ and $f_o$, control the operation of respective solid state switches 16 and 18. The switches 16 and 18, in the embodiment of FIG. 2, are P-channel type field effect transistors (FET) as respectively indicated at Q1 and Q2. Thus, the pulses generated by timers 12 and 14 are respectively applied to the gates of FET's Q1 and Q2 to cause energization of lamp 10 in the manner to be described below.

A driver in accordance with the present invention also includes an inductance L1 which is connected in series with switch 16 across the regulated source voltage $V_{DD}$. The driver further includes a diode D1, the purpose of which will be discussed below, a Zener diode D2 which provides open-circuit protection for the solid state switches 16 and 18, and a resistance R1 which is connected in series with the lamp load 10.

Referring to FIG. 2, the external passive circuit components which determine the frequency and duty cycle of pulse generator 12 comprise resistors R2 and R3 and capacitor C1 with the off-time being set by R3 and C1. Similarly, the frequency and duty cycle of pulse generator 14 is determined b resistors R4 and R5 and capacitor C2. Capacitors C4 and C5 isolate the off-time control pins of the timers, i.e., the pulse generators 12 and 14, from noise. The output of pulse generator 14 is applied via resistor R2 as an enabling/disabling command signal to pulse generator 12. The enabling signal for pulse generator 14 is developed across biasing resistor R4 which is connected to $V_{DD}$. The purpose of resistor R6, connected in series with transistor Q2 (switch 14) will be described below. The function of resistor R7, which is connected to the control input of pulse generator 12, will also be described below. Diode D3 and capacitor C3 provide reverse polarity protection and smooth any ripple in the supply voltage $V_{in}$ to thereby provide $V_{DD}$.

The operation of the disclosed embodiment of the invention will now be described with reference jointly to FIGS. 2 and 3. Pulse generator 12 provides a clock signal $f_L$ which is directly applied to the gate of transistor Q1. Since transistor Q1 is a P-channel type FET, the device is gated to the conductive state when the output of pulse generator 12 goes low. Considering time $t_o$, the output of pulse generator 14 will be "high" and this output will be applied to the gate of transistor Q2 (switch 14) to hold Q2 in the non-conductive state. The $f_o$ output signal from pulse generator 14 will also be applied, via resistor R2, as the enabling input to pulse generator 12.

Each time transistor Q1 is turned on in response to a negative going output pulse from pulse generator 12, i.e., during each period of time $t_{on}$, a current IL will flow through inductor L1. When transistor Q1 is turned off, the inductor current must continue and is forced to flow through diode D1, resistor R1 and the EL lamp load 10. This "packet" of current induces a small change in the voltage across the EL lamp 10 as follows:

$$\Delta V_{EL} = \frac{-V_{DD}}{\sqrt{VL_1 \cdot C_{EL}}} \cdot t_{on} \quad (1)$$

The above-described process continues, i.e., transistor Q1 is periodically and repeatedly turned on and off, for a period of time:

$$t_{ph} = \frac{1}{f_o} - t_{DSC} \quad (2)$$

where $f_o$ is the frequency seen by the EL lamp load 10, as determined by pulse generator 14. In one reduction to practice, where the frequency of pulse generator 12 was 100 KHz, the frequency of pulse generator 14 was 2 KHz. The net result of the series of $\Delta V_{EL}$ voltage changes is the charging of the capacitive lamp load to its peak value. Once $V_{EL}$ reaches its peak value $-V_{EL(pk)}$, the output of pulse generator 14 will go negative, thus turning transistor Q2 (switch 14) on and disabling pulse generator 12 (with Q1 non-conductive). Conduction of transistor Q2 will result in the capacitive lamp load charging through resistors R1 and R6 to a voltage of $+V_{DD}$.

The brightness of the lamp 10 may be adjusted by applying a voltage, via resistor R7, to the control input of pulse generator 12. This voltage, for example, may be derived from an external voltage divider network connected between voltage $V_{DD}$ and ground. The externally derived control voltage, if any, is delivered to a terminal "TRIM" provided on the driver and will cause the duty cycle of pulse generator 12 to change thereby varying the energy delivered to the lamp during each cycle thus varying $-V_{EL(pk)}$.

With an open output circuit, i.e., with no capacitive load connected between terminal 11 and ground, there would be no path for the current $I_L$ when transistor Q1 is in the non-conductive state. This condition would cause the inductor L1 to generate voltages sufficiently high to break over the junction of either of FET's Q1 or Q2. The Zener diode D2 prevents the voltage generated by inductor L1 from reaching a level sufficiently high to damage Q1 and Q2 by providing a deterministic current path.

Resistors R1 and R6 provide short circuit protection. Should the lamp load short circuit, in the absence of R1 and R6, transistor Q2 would be connected across the supply voltage $V_{DD}$ and the current $I_{Q2}$ through switch Q2 would be limited only by the internal resistance $r_{ds}$ of Q2. Resistors R1 and R6 limit $I_{Q2}$ to within the safe operating range of Q2. Resistor R1 also acts to absorb and dissipate energy stored in inductor L1. It is to be noted that, under normal operating conditions, the effect of resistor R1 is negligible since the series resistance of the EL lamp load 10 ($R_{ITO}$) is much greater than that of R1.

From the above discussion, it will be recognized by those skilled in the art that the driver circuit of the present invention closely emulates a constant current source by delivering energy to an EL lamp load in a series of constant energy "packets". The driver circuit employs the minimum number of components and does not utilize a transformer. Accordingly, the driver circuit of the present invention is inexpensive, reliable and can easily be provided in integrated circuit form. Also, the driver circuit of the present invention affords the user the ability to exercise control over the output voltage, i.e., the maximum voltage to which the lamp load is charged, by changing the duty cycle of one of a pair of oscillators.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. Apparatus for generating a periodic signal for application to a capacitive load comprising:

first oscillator means, said first oscillator means providing a first switch control signal at a first frequency when enabled, said first control signal having two states and a first duty cycle;

an inductance;

first normally open switch means, said first switch means being connected to said first oscillator means whereby said first switch means is operated to the closed state when said first control signal is in a first state;

means connecting said inductance and said first switch means in series across a source of electrical energy second free-running oscillator means, said second oscillator means providing a second switch control signal at a second frequency which is lower than said first frequency, said second switch control signal having two states and a second duty cycle;

second normally open switch means, said second switch means being connected to said second oscillator means whereby said second switch means is operated to the closed state when said second control signal is in a second state;

means for connecting said second switch means in series with the load and the source of electrical energy whereby the load can charge to a first voltage level of a first polarity when said second switch means is in the closed state;

means for applying said second switch control signal as the enabling signal to said first oscillator means whereby said first oscillator means will be enabled when said second switch control signal is in the first state, said first switch control signal causing said first switch means to be repeatedly closed whereby current will periodically flow from the energy source through said inductance when said first oscillator means is enabled; and means connecting said inductance to the load, said connecting means permitting current flow in only a first direction, current flowing to the load via said connecting means each time said first switch means is opened whereby the load is charged to a second polarity voltage level in step-wise fashion.

2. The apparatus of claim 1 wherein said capacitive load is an electroluminescent lamp.

3. The apparatus of claim 1 wherein said first and second oscillator means comprise timing circuits which generate generally rectangular pulses.

4. The apparatus of claim 1 wherein said first and second switch means each comprise a solid state switch.

5. The apparatus of claim 4 wherein said solid state switches each comprise a field effect transistor.

6. The apparatus of claim 2 wherein said first and second oscillator means comprise timing circuits which generate generally rectangular pulses.

7. The apparatus of claim 6 wherein said first and second switch means each comprise a solid state switch.

8. The apparatus of claim 7 wherein said solid state switches each comprise a field effect transistor.

9. The apparatus of claim 2 further comprising a resistance connected in series with the lamp load, charging current for the load passing through said resistance when either of said first or second switch means are in the closed state.

10. The apparatus of claim 1 further comprising means connected in parallel with said first switch mean for providing over-voltage protection for said switch means.

11. The apparatus of claim 1 further comprising means for applying an external control signal to vary the duty cycle of said first oscillator means to thereby vary the magnitude of the level to which the load is charged in step-wise fashion.

12. The apparatus of claim 7 further comprising a resistance connected in series with the lamp load, charging current for the load passing through said resistance when either of said first or second switch means are in the closed state.

13. The apparatus of claim 12 further comprising means connected in parallel with said first switch means for providing over-voltage protection for said switch means.

14. The apparatus of claim 13 wherein said solid state switches each comprise a field effect transistor.

15. The apparatus of claim 7 further comprising means for applying an external control signal to vary the duty cycle of said first oscillator means to thereby vary the magnitude of the level to which the load is charged in step-wise fashion.

16. The apparatus of claim 13 further comprising means for applying an external control signal to vary the duty cycle of said first oscillator means to thereby vary the magnitude of the level to which the load is charged in step-wise fashion.

* * * * *